(12) United States Patent
Ersue et al.

(10) Patent No.: US 7,602,507 B2
(45) Date of Patent: Oct. 13, 2009

(54) SENSOR FOR MEASURING THE SURFACE OF AN OBJECT

(75) Inventors: Enis Ersue, Darmstadt (DE); Georg Lambert, Darmstadt (DE)

(73) Assignee: ISRA Vision AG, Darmstadt (DE)

( * ) Notice: Subject to any disclaimer, the term of this patent is extended or adjusted under 35 U.S.C. 154(b) by 111 days.

(21) Appl. No.: 11/570,576

(22) PCT Filed: Jun. 13, 2005

(86) PCT No.: PCT/EP2005/006300

§ 371 (c)(1),
(2), (4) Date: Aug. 6, 2007

(87) PCT Pub. No.: WO2005/121699

PCT Pub. Date: Dec. 22, 2005

(65) Prior Publication Data

US 2008/0037033 A1 Feb. 14, 2008

(30) Foreign Application Priority Data

Jun. 14, 2004 (DE) .................. 20 2004 009 224 U

(51) Int. Cl.
*G01B 11/24* (2006.01)
(52) U.S. Cl. ........................ 356/604; 356/603
(58) Field of Classification Search ......... 356/603–604, 356/3.01–3.09; 382/106, 108, 152–154, 382/291, 294, 199; 351/212, 211; 250/559.23, 250/559.22, 237 G
See application file for complete search history.

(56) References Cited

U.S. PATENT DOCUMENTS

| | | | |
|---|---|---|---|
| 5,615,003 A | 3/1997 | Hermary et al. | |
| 6,256,099 B1 | 7/2001 | Kaufmann et al. | |
| 6,542,248 B1 * | 4/2003 | Schwarz | 356/600 |
| 2001/0038705 A1 | 11/2001 | Rubbert et al. | |
| 2005/0090749 A1 | 4/2005 | Rubbert | |

FOREIGN PATENT DOCUMENTS

| | | |
|---|---|---|
| DE | 40 34 007 | 4/1992 |
| DE | 44 02 414 | 8/1994 |
| DE | 196 36 354 | 3/1998 |
| DE | 197 42 264 | 4/1999 |
| DE | 298 16 344 | 4/1999 |

* cited by examiner

*Primary Examiner*—Michael A Lyons
*Assistant Examiner*—Tri T Ton
(74) *Attorney, Agent, or Firm*—Michael J. Striker

(57) ABSTRACT

The invention relates to a sensor for measuring the surface of an object, having a contrasting unit (3) for projecting a pattern onto the surface of the object, and having a camera (4) for recording of the pattern projected onto the surface of the object, in which the contrasting unit (3) has an LED projector (5). To achieve high precision and great robustness, the camera (4) and the LED projector (5) are located in the longitudinal direction. In addition, respective deflecting mirrors (8, 11) are assigned to the camera (4) and the LED projector (5) and are located on opposite ends, in the longitudinal direction of the sensor (1), of the housing (2) of the sensor (1).

18 Claims, 2 Drawing Sheets

SENSOR FOR MEASURING THE SURFACE OF AN OBJECT

BACKGROUND OF THE INVENTION

The invention relates to a sensor for measuring the surface of an object, having a contrasting unit for projecting a pattern onto the surface of the object, and having a camera for recording the pattern projected onto the surface of the object. This sensor, with an evaluation unit that can be connected to the sensor or integrated with the sensor, is especially suitable for the measurement principle of triangulation.

Such sensors operating on the principle of triangulation are already known. They use lasers as a contrasting unit, and for contrast purposes they project a stripe onto the surface to be measured. This fundamental principle is known for instance from U.S. Pat. No. 6,256,099 B1 or from German Patent Disclosure DE 44 02 414 A1. By evaluating the stripe recorded by the camera, 3-dimensional points can be ascertained along a curve, which provide information about the surface structure. A disadvantage of the previously known sensors is that because of the laser for generating the contrast stripe, they have a large structural shape. Moreover, the laser light presents safety risks to humans located in the measurement region, if the laser light strikes the retina. Moreover, lasers are sensitive optical devices, so that the known sensors react sensitively to jarring and taken all in all are not robust.

From German Utility Model DE 298 16 344 U1, a similar device for contactless optical 3-dimensional measurement analysis is known, in which a projector, embodied for instance as an LED lighting fixture, and a camera are provided in a sensor housing. While the projector is located transversely to the emission direction and the projection image is deflected from the housing via a mirror, the camera is located with its optical axis in the emission direction. This makes for a tall sensor housing, which can easily collide with the vehicle to which it is affixed, or restricts the adjustment path thereof.

From German Patent Disclosure DE 197 42 264 A1, an endoscope for optical 3-dimensional detection of objects is known, having a recording device and a surface lighting fixture, embodied as a projector, which is located along the longitudinal axis of the endoscope housing. The projection image and the recorded image exit and enter the endoscope through a common opening. As a result, a compact measurement system is created that enables 3-dimensional detection of an object even at inaccessible locations. In published US Patent Disclosure US 2001/0038705 A1, a similar optical principle is described for a scanning system, in which a projected image and a recorded image exit and enter through a common opening. Because of this optical arrangement, however, precise measurement of the object is not possible.

SUMMARY OF THE INVENTION

The object of the invention is therefore to propose a sensor of the type defined at the outset which is compact in construction and robust in use and makes high precision in measurement possible.

This object is attained in a sensor of the type defined at the outset with the characteristics of claim 1, essentially that the contrasting unit has an LED projector. LEDs (light emitting diodes) can be triggered, in comparison to a laser, by less-complicated electronics, which according to the invention can be integrated with the sensor, and they are furthermore less expensive. LEDs are invulnerable to jarring and temperature fluctuations, and the generated light is not so dangerous to the human eye. By the use of an LED projector, a small, flexibly usable sensor for surface measurement is accordingly created which is capable for instance also of being mounted on a robot, with the loads involved in such a situation. Moreover, the camera and the LED projector are located in a longitudinal arrangement in the sensor housing. This housing therefore has only a low structural height and depth and is somewhat rectangular in cross section. In order to project the projection image out of the housing and record its image on the object, the camera and the projector are each assigned deflecting mirrors, which are located on opposite ends in the longitudinal direction of the sensor and which catch the projection image from the sensor and focus its recorded image into the sensor. Since the optical axes of the projection and the image recording in this arrangement have the greatest possible spacing apart, the outcome of measurement has the greatest possible precision.

High-quality projection can be attained by the LED projector which has a high-power LED, a Fresnel lens, and a mask for pattern generation.

The projected pattern may for instance comprise one or more stripes. In order to be able to ascertain not only 3-dimensional points along a curve, the pattern can according to the invention comprise a plurality of stripes or have such stripes. Alternatively, still other surface patterns may be used. Thus by means of triangulation, for instance, 3-dimensional point data of a surface can be obtained, so that from the plurality of stripes or from the surface pattern, a 3-dimensional area can be ascertained. For that purpose, the LED projector is suitably calibrated in order to obtain a model of the location of the striped pattern or projection pattern in space.

The 3-dimensional surface data can then be calculated to sub-pixel precision by an evaluation unit, which according to the invention can be connected to a sensor or integrated with it. The measurement points can be displayed with splines or as polygons. According to the invention, however, the pattern can also be adapted to the surface and can for instance comprise a projection of concentric circles, radial rays, or other geometric figures of this sort. Moreover, it is possible for stripes and/or other geometric figures to be combined in one projection.

To make the evaluation more certain, the pattern can be embodied in encoded form. In a pattern formed of a plurality of stripes, for instance, each stripe is assigned its own code, for instance in the form of a bar code or other unambiguous identifier. The code enhances the robustness of stripe detection in the image, since in encoded stripes, a plausibility check for the counting of the stripes in the image that is necessary in the evaluation can be done. Coding is analogously possible in other projected patterns as well.

To enable adapting the pattern to various object surfaces, in an especially preferred embodiment the LED projector can be mounted rotatably. As a result, the pattern can be rotated on the surface and optimally adapted to the surface structure. For operation, the LED projector is preferably locked, to avoid an adjustment or loss of adjustment.

In an especially preferred embodiment of the invention, a surface lighting fixture, in particular an LED surface lighting fixture, can be integrated with the sensor. As a result of the surface lighting fixture, the camera of the sensor can also perceive 2-dimensional features on the object surface.

An advantageous construction of the sensor according to the invention provides that the camera and the LED projector are mounted in the longitudinal direction on an optical axis. This makes the setting and the evaluation of the outcomes of measurement easier, because the optical axes of the projector and the camera match.

In this case, the camera and the LED projector are preferably each assigned a movable deflecting mirror. By means of the deflecting mirrors, the projection pattern of the LED projector is aimed at the surface of the object, and the viewing field of the camera is aimed at the same surface. The result is a computational length of the triangulation basis that is greater than the housing length. Moreover, the structural form is optimized such that it represents the smallest possible structural form to achieve a certain length of the triangulation basis with the highest packing density.

According to the invention, the camera and/or the LED projector can have an interchangeable lens system and/or a filter. Changing lens systems, in particular with different focal lengths and optionally with adjustable angles of the deflecting mirrors, makes it possible to adapt the sensor or to use it for many ranges of precision and distance. Moreover, it is appropriate to place filters, adapted to the color or the spectrum of the LEDs used for the projection and/or lighting, in front of the camera in order to minimize the influence of extraneous light and the surroundings.

Advantageously, a lighting controller for continuous lighting and/or flash operation is associated with the LED projector and/or the surface lighting fixture, which is integrated with the sensor, for instance in the form of an electronic control unit. The electronic unit serves to trigger the LEDs. Preferably, the LED projector and/or the surface lighting fixture are switchable separately from one another, so that both lighting channels (the LED projector and the LED surface lighting fixture) are triggerable separately from one another. Operation with flash is possible for both channels. Moreover, according to the invention, the LEDs may be switched at a defined activation point for a defined length of time.

In the LEDs, the switch-on and switch-off delays are extremely short. The LED projector and the LED surface lighting fixture according to the invention can therefore be switched extremely briefly and quickly one after the other, producing a flash. Hence successive measurements can be made within very short lengths of time, and in them the LED projector, the surface lighting fixture, the camera, and/or an integrated evaluation device, or one that can be connected to the sensor, can be switched for instance in a cycle of approximately 1 to 50 ms.

For unproblematic triggering of the sensor and evaluation of the sensor data, it is especially advantageous if an electronic unit with a microprocessor for automatic identification of the sensor is integrated with the sensor via an electronic memory, for communication of the sensor with a connection unit and/or for temperature compensation and calibration data administration. By means of the identification of the sensor in an integrated sensor electronic unit, flexible connection to various connection units is possible, and the requisite communication can be attained without further adjustments in a plug-and-play version. Sensor specific evaluation data, for instance for temperature compensation or calibration data administration, can furthermore be associated directly with the sensor and are equally available to each connection unit. All the data can be stored in a memory of the electronic unit. Moreover, the electronic unit for the connected sensor can make its own communications channel available to the connection unit, so that parallel communication with a plurality of connected sensors is possible. The lighting control can also be integrated into the electronic unit.

Optimal handling of the sensor can be attained if the sensor is located in a housing, in which exit openings associated with the LED projector, the camera, and optionally the surface lighting fixture are located on one side of the housing. The surface lighting fixture can be positioned in the middle of the housing in the longitudinal direction. The LED projector and the camera are preferably located on both sides of the surface lighting fixture, and the deflecting mirrors are each located on the ends of the housing. Fastening the sensor unit for fixation to a handling device, such as a robot, can also be done in the middle of the housing in terms of the longitudinal direction.

To facilitate the production of the sensor and maintenance work, the housing of the sensor can be constructed in multiple parts. In this way, the individual components of the sensor are easily accessible. In particular, the housing can be constructed so as to be divided along its entire longitudinal direction. Moreover, the housing can also comprise two or more housing parts in the longitudinal direction. By means of this kind of modular construction, it is possible, for instance by inserting an intermediate part into the center of the housing, to lengthen the entire housing and to increase the spacing between the projection opening and the camera opening, to achieve greater precision in the triangulation.

To improve the accessibility to the sensor interior, the housing of the sensor can be constructed from two L-shaped housing parts fixed to one another, which are screwed together at the face ends. The components of the sensor, and in particular the projector, camera, and/or surface lighting fixture, are preferably affixed to one housing part. By disconnecting the housing parts, these components are then especially easily accessible.

To protect the individual components and for their preassembly, the contrasting unit, together with the LED projector, the camera and/or the LED surface lighting fixture can have its own housing.

By means of the above-described building block construction, it is possible in a structurally simple way to achieve a sensor with variable measurement distance, variable measurement volume, and variable precision. To that end, the lens systems on the camera and/or on the projector, the housing length, and/or the angle of the deflecting mirrors in their angular holders, can all be changed.

It is moreover especially advantageous if the housing of the sensor, the housings of the individual sensor components, or parts thereof are produced from a carbon fiber composite material (CFK). For instance, a CFK base plate could be provided, on which all the optical components of the sensor are located. CFK composite materials are lightweight and robust and have a very stable temperature behavior, so that the optical system can also be used for applications involving major temperature fluctuations. Often, such temperature fluctuations occur in factory buildings as well because of seasonal differences in temperature. The CFK base plate can then be fixed in the middle of a sensor housing, the housing comprising conventional materials, and be supported in floating fashion to both sides. Because of this free support in the longitudinal direction of the sensor, materials with a different temperature behavior can also be used for the housing and the base plate. Thus the housing of the sensor, for instance, can expand or contract upon a change of temperature, while the base plate having the optical components is temperature-stable, so as to make excellent optical quality of the sensor possible.

BRIEF DESCRIPTION OF THE DRAWINGS

Further characteristics, advantages, and possible applications of the invention will become apparent from the ensuing description of a preferred embodiment and from the drawings. All the characteristics described and/or shown in the drawing form the subject of the invention individually, regardless of how they are summarized in the claims or the claims dependency.

Shown are.

DETAILED DESCRIPTION OF THE INVENTION

Figure 1:
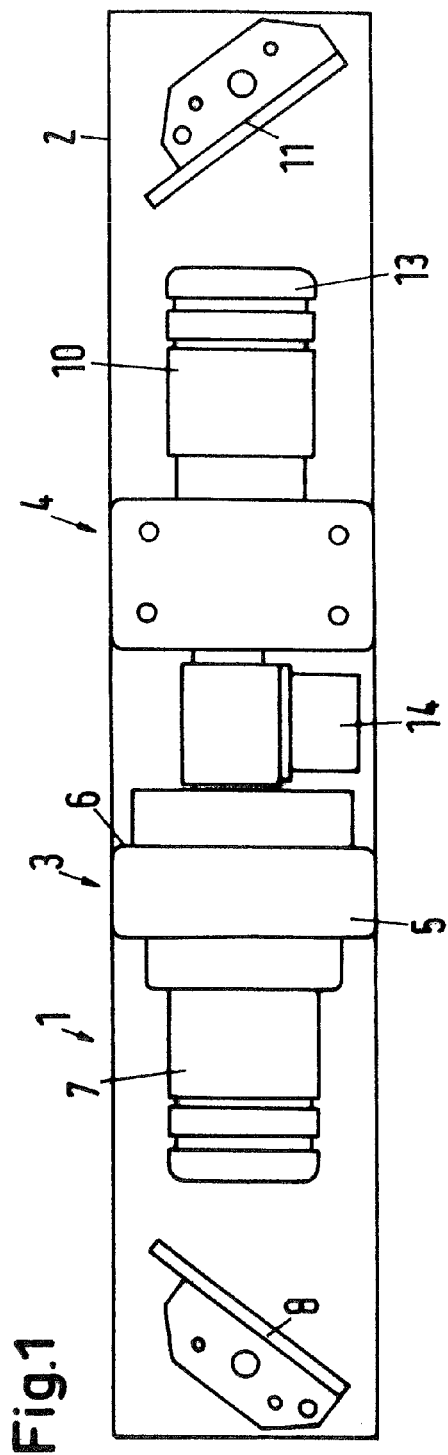
FIG. 1, a schematic plan view on the interior construction of a sensor according to the invention.

FIG. 1 shows the construction of a sensor 1 according to the invention for measuring the surface of an object in a housing 2. The sensor 1 has a contrasting unit 3 for projecting a pattern onto the surface of the object and also has a camera 4 for recording the pattern projected onto the surface of the object.

Figure 2:
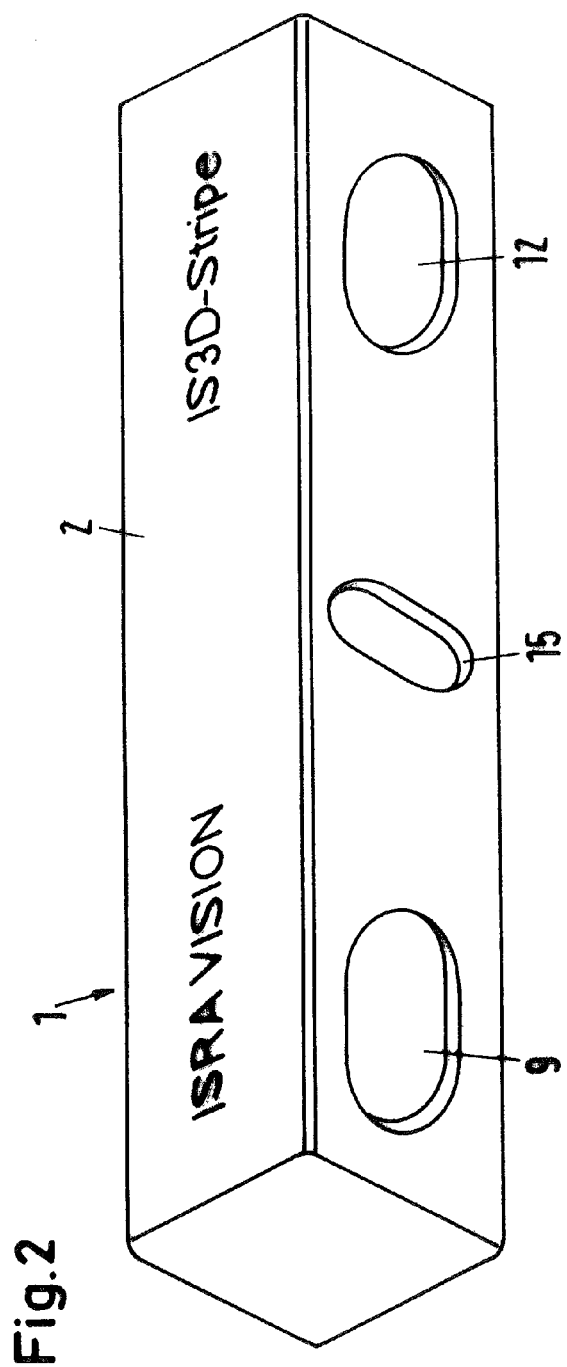
FIG. 2, a three-dimensional elevation view of the housing of the sensor of FIG. 1.

The contrasting unit 3 includes an LED projector 5, which generates a pattern that comprises a plurality of encoded stripes. To that end, a suitable LED and optics are received in the projector housing 6, which is closeable with a cap and is rotatable, and the projector housing 6 can be fixed in operation. For generating a projection image of the object surface to be measured, a lens system 7 is placed on the LED projector 5 and aimed at a deflecting mirror 8. The deflecting mirror 8 projects the projection image through a projection opening 9 (see FIG. 2) onto the surface to be measured of an object, not shown.

The projected image generated there is recorded by the camera 4. To that end, a lens system 10 of the camera 4 is aimed at a deflecting mirror 11, which intercepts the projection image through a camera opening 12 (see FIG. 2) and projects it onto the sensor area of the camera 4. A filter 13 is mounted in front of the lens system 10 of the camera 4.

The LED surface lighting fixture 14 is located in the middle of the housing 1 and preferably comprises a plurality of LEDs (at least two). The light from these LEDs leaves the sensor 1 through a lighting fixture opening 15 (see FIG. 2) and serves the purpose of uniform illumination of the object surface to be measured.

For triggering the LED projector 5 and the LED surface lighting fixture 14, a lighting controller or electronic unit, not shown, is provided, which may be integrated with the sensor 1. This unit can subject the LED projector 5 and the LED surface lighting fixture 14 each separately to continuous lighting or flash lighting. A corresponding controller of the camera 4 is jointly integrated with the housing of the camera and is connected, via terminals not shown, to an evaluation device for evaluation of the recorded images.

Particularly by combining the LED projector 5 with the LED surface lighting fixture 14, the location of a bore or other recess, for instance, in a surface can be measured very efficiently. For that purpose, separate recordings can be made with the projected pattern and the surface lighting fixture. By coupling the two recordings or ascertained position data, the position of the feature in 3-dimensional space can be ascertained very precisely.

The LED surface lighting fixture 14 is located in the middle of the housing 2 in terms of the longitudinal direction. The LED projector 5 and the camera 4 are located on both sides of the LED surface lighting fixture 14, on a common optical axis which is located in the longitudinal direction of the housing 2, and the viewing directions of the camera 4 and the LED projector 5 are diametrically opposed. One deflecting mirror 8, 11 each is located in the optical axis in the longitudinal direction on the respective ends of the housing 2, and the angle of the deflecting mirrors 8, 11 relative to the optical axis can be changed. By means of the deflecting mirrors 8, 11, the projection image and the image to be recorded can be directed through the projection opening 9 and camera opening 12 that are located in one side of the housing 2. The lighting fixture opening 15 is located in the same side of the housing 2, at the point corresponding to the LED surface lighting fixture 14.

Figure 3:
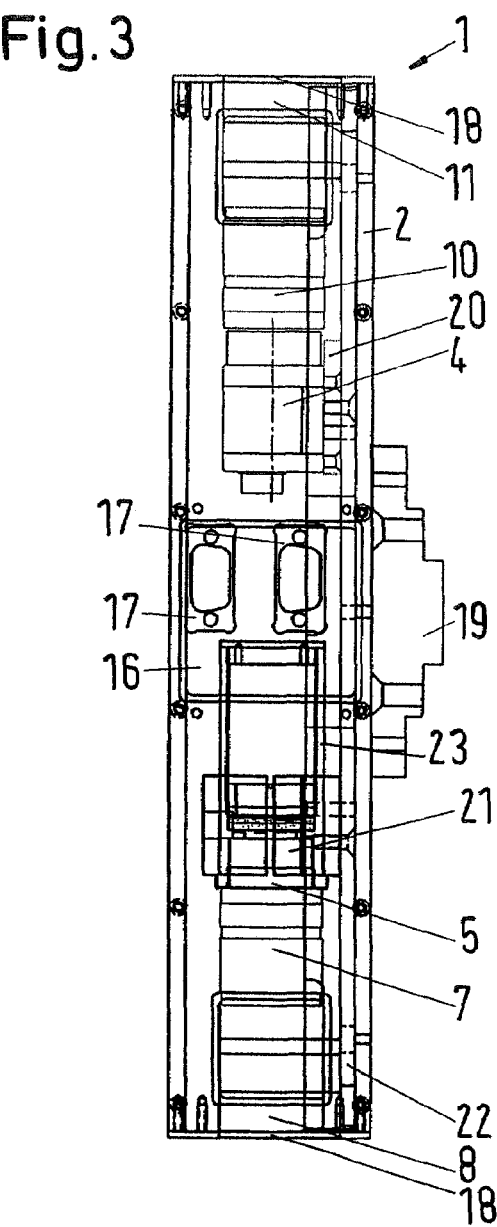
FIG. 3, a longitudinal section through the sensor housing of FIG. 1.

The longitudinal section through the sensor 1 shown in FIG. 3 shows a detailed view of the internal construction of the sensor 1. In the direction shown, from top to bottom, a deflecting mirror 11 with a mirror holder, a lens system 10, and a camera 4 are integrated with the housing 2 of the sensor 1. This is adjoined by an LED surface lighting fixture 14, not shown in FIG. 3, which is concealed in FIG. 3 by a connection plate 16 with terminals 17 that is mounted on the outside of the housing 2. Toward the bottom, this is adjoined by the LED projector 5, received in a separate projector housing 23, with its lens system 7, which is aimed at the deflecting mirror with its mirror holder. At the face ends of the housing 2 that are shown at the top and bottom in terms of the longitudinal direction, the housing 2 is closed by side caps 18 that can be screwed to the housing 2. In the middle of the housing 2 in terms of the longitudinal direction, a fastening 19 is provided from outside, with which the sensor 1 can be mounted on a handling device.

The camera 4 and the projector 5 are mounted with a camera holder 20 and a projector holder 21 on a common base plate 22 comprising a carbon fiber composite material, and the base plate is in turn mounted on the housing 2 of the sensor 1. The projector 5 and the camera 4 are each located in their own housings, which are secured to the projector holder 21 and to the camera holder 20. The base plate 22 is fixed to the housing 2 in the middle in terms of the longitudinal direction of the sensor 1 and is supported in floating fashion in the housing 2 toward the ends of the housing 2. This has the advantage that the highly temperature-stable base plate 22, with the optics mounted on it, is stationary, and the housing 2 of the sensor 1 can shift relative to the base plate, for instance upon a change in length caused by a temperature factor, without changing the optical properties of the sensor 1.

The use of a common base plate 22 for the optical components comprising the camera 4, projector 5, and optionally surface lighting fixture 14 thus has the advantage that the optical system is securely fixed and will no longer go out of adjustment. The use of carbon fiber composite material for the base plate 22 furthermore has the advantage that the base plate 22 has a highly stable temperature behavior.

Figure 4:
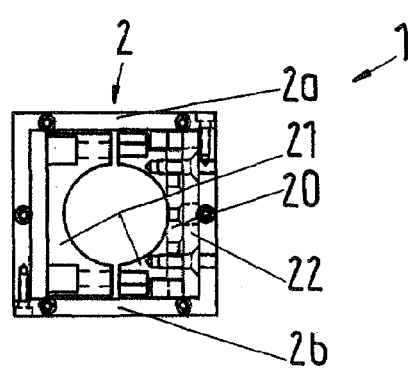
FIG. 4, a cross section through the sensor housing of FIG. 1.

As the cross section in FIG. 4 shows, the housing 2 of the sensor 1 is constructed of two L-shaped housing parts 2a, 2b, which each comprise two legs that are perpendicular to one another. The housing parts 2a, 2b are embodied identically in their basic shape and each have one longer leg and one shorter leg. As a result, the housing parts can be placed against one another in such a way that the shorter leg of each abuts against the inside of the longer leg and is screwed to that leg. A rectangular free space is embodied in the interior of the housing 2, and the components of the sensor 1 are received in this space.

The base plate 22 is affixed to the one housing part 2b. The camera holder 20 and the projector holder 21 are screwed to the base plate 22. As a result of this construction, the housing 2 of the sensor 1 can easily be opened without requiring that the components of the sensor be recalibrated optically afterward.

A separate projector housing 23, not shown in detail, is fixed in the projector holder 21. The projector housing 23 has an LED holder that is fixed to one face end of the projector housing. Also located in this face end is a through opening for the cable connections of the LEDs. Via a screw ring guided in a female thread of the projector holder 23, a Fresnel lens and a strip mask for generating the projection pattern can be fixed in the projector holder 23 against a protrusion embodied in the interior of the projector holder 23. The Fresnel lens and the strip mask are easily replaceable in this way.

Because of the separate projector housing 23, the projector 5 can be preassembled and tested, so that when the sensor 1 is installed, a finished, functional projector 5 can already be used. This makes both assembly and replacement of the projector 5 in the event of a defect simpler.

This design represents an optimal construction, in which the triangulation basis for evaluating the images is the greatest, with the maximum packing density and the greatest possible compactness. The sensor 1 of the invention may, however, be achieved with some other sensor construction; in comparison to laser systems, the use of LEDs as lighting and contrasting units involves fewer safety risks and has enormous cost advantages, besides requiring less space.

The sensor 1 may be used according to the invention for 3-dimensional measurement tasks in final assembly. It is also highly suitable for objects that are painted in different colors. The sensor 1 can additionally be used in rough construction or on raw metal sheets. Another area of use is robot guidance tasks, such as seam guidance or seam tracking. The sensor can also be used for measuring or monitoring profiles or profiled surfaces, as well as for determining 3-dimensional profiles of applied strips of adhesive, or for other in-line inspection tasks. The sensor 1 can furnish 3-dimensional data at a high rate, such as every 1 to 50 milliseconds, and the LED lighting fixtures can flash at a corresponding rate.

LIST OF REFERENCE NUMERALS

1 Sensor
2 Housing
2a, 2b housing parts
3 Contrasting unit
4 Camera
5 LED projector
6 Projector housing
7 Lens system
8 Deflecting mirror
9 Projection opening
10 Lens system
11 Deflecting mirror
12 Camera opening
13 Filter
14 LED surface lighting fixture
15 Lighting fixture opening
16 Connection plate
17 Connection
18 Side cap
19 Fastening
20 Camera holder
21 Projector holder
22 Base plate
23 Projector housing

What is claimed is:

1. A sensor arranged within a housing and adapted for measuring the surface of an object, the sensor comprising:
   a contrasting unit that includes a LED projector for projecting a pattern onto the surface of the object, and
   a camera for recording the pattern projected onto the surface of the object,
   wherein the camera and the LED projector are arranged along a longitudinal axis of the housing,
   first and second deflecting mirrors adapted to operate with the LED projector and the camera respectively, and which are positioned respectively at opposite ends of the housing along the longitudinal axis, and
   a LED surface lighting fixture integrated within the sensor housing.

2. The sensor as defined by claim 1, wherein the LED projector has a high-power LED, a Fresnel lens, and a mask for pattern generation.

3. The sensor as defined by claim 1, wherein the pattern has a plurality of stripes or comprises a different surface pattern.

4. The sensor as defined by claim 1, wherein the pattern is encoded.

5. The sensor as defined by claim 1, wherein the LED projector is rotatably mounted and optionally lockable.

6. The sensor as defined by claim 1, wherein the camera and the LED projector are disposed on an optical axis.

7. The sensor as defined by one of the foregoing claims, wherein a deflecting mirror is located movably.

8. The sensor as defined by claim 1, wherein the camera or the LED projector have an interchangeable lens system or a filter.

9. The sensor as defined by claim 1, wherein a lighting controller for continuous lighting or flash operation is associated with the LED projector and/or the surface lighting fixture.

10. The sensor as defined by claim 1, wherein the LED projector or the surface lighting fixture are switchable separately from one another.

11. The sensor as defined by claim 1, wherein the LED projector, the surface lighting fixture the camera or an evaluation device are switchable at a cycle of approximately 1 to 50 ms.

12. The sensor as defined by claim 1, wherein an electronic unit with a microprocessor for automatic identification of the sensor is integrated with the sensor via an electronic memory, for communication of the sensor with a connection unit and/or for temperature compensation and calibration data administration.

13. The sensor as defined by claim 1, wherein the sensor is located in a housing, in which exit openings associated with the LED projector, the camera, and optionally the surface lighting fixture are located on one side of the housing.

14. The sensor as defined by claim 1, wherein the surface lighting fixture is positioned in the middle of the housing in the longitudinal direction, and the LED projector, and the camera are located on both sides of the surface lighting fixture.

15. The sensor as defined by claim 1, wherein the housing of the sensor is constructed in multiple parts.

16. The sensor as defined by claim 15, wherein the housing of the sensor is constructed from two L-shaped housing parts fixed to one another.

17. The sensor as defined by claim 1, wherein the contrasting unit together with the LED projector, the camera or the LED surface lighting fixture has its own housing.

18. The sensor as defined by claim 1, wherein the housing of the sensor, or parts thereof, is produced from a glass-fiber-reinforced composite material.

* * * * *